(12) United States Patent
Hahn

(10) Patent No.: US 6,517,653 B2
(45) Date of Patent: Feb. 11, 2003

(54) PROCESS FOR IMPROVING THE CURED ADHESION OF A PRECURED RUBBER COMPOUND TO AN UNCURED RUBBER COMPOUND

(75) Inventor: Bruce Raymond Hahn, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 85 days.

(21) Appl. No.: 09/729,372

(22) Filed: Dec. 4, 2000

(65) Prior Publication Data

US 2002/0046798 A1 Apr. 25, 2002

Related U.S. Application Data

(63) Continuation-in-part of application No. 09/251,249, filed on Feb. 16, 1999, now abandoned, which is a continuation-in-part of application No. 08/915,413, filed on Aug. 20, 1997, now abandoned.

(51) Int. Cl.[7] ............................. B29D 30/06; B60C 1/00
(52) U.S. Cl. ..................... 156/123; 152/209.6; 152/547; 152/510; 156/96; 156/129; 156/130.5; 156/135
(58) Field of Search ............................. 156/96, 110.1, 156/123, 127, 128.1, 128.6, 129, 130.5, 131, 135; 152/209.6, 541, 547, 209.5, 510

(56) References Cited

U.S. PATENT DOCUMENTS

| 3,768,537 A | 10/1973 | Hess et al. ................... 152/330 |
| 3,878,013 A | 4/1975 | Kresta ......................... 156/132 |
| 4,089,360 A | 5/1978 | Rohm ......................... 152/330 |
| 4,371,411 A | 2/1983 | Honda et al. ................ 156/281 |
| 4,558,086 A | 12/1985 | Ramp et al. ................. 524/399 |
| 4,851,063 A | 7/1989 | Seiberling .................... 156/123 |
| 5,447,971 A | 9/1995 | Bergh et al. ................. 523/213 |
| 5,536,348 A | 7/1996 | Chlebina et al. ............ 156/129 |
| 5,679,729 A | * 10/1997 | Wideman et al. ........... 523/216 |

FOREIGN PATENT DOCUMENTS

| EP | 700958 A1 | * 3/1996 |
| GB | 851725 | 10/1960 |

OTHER PUBLICATIONS

European Search Report.

* cited by examiner

Primary Examiner—Geoffrey L. Knable
(74) Attorney, Agent, or Firm—Bruce J. Hendricks; John D. DeLong

(57) ABSTRACT

The present invention relates to a process for improving the cured adhesion of at least two rubber components which contact each other in a pneumatic tire. The process involves the steps of assembling and vulcanizing a pneumatic tire wherein prior to vulcanization of the pneumatic tire, one of the components is a precured rubber compound and the other is an uncured rubber compound. The process involves using a precured rubber compound comprising from 40 to 100 parts by weight of natural rubber or emulsion-polymerized styrene-butadiene copolymer rubber containing 0.5 to 3 phr of a fatty acid, precipitated silica and no fatty acid other than contained in the natural rubber or emulsion-polymerized styrene-butadiene rubber.

11 Claims, No Drawings

PROCESS FOR IMPROVING THE CURED ADHESION OF A PRECURED RUBBER COMPOUND TO AN UNCURED RUBBER COMPOUND

This is a Continuation-in-Part of application Ser. No. 09/251,249, filed on Feb. 16, 1999, now abandoned, which is a Continuation-in-Part of application Ser. No. 08/915,413, filed on Aug. 20, 1997, now abandoned.

BACKGROUND OF THE INVENTION

Cured adhesion of cured or precured rubber components to green "uncured" rubber stock is important in tire retreading and in the manufacture of tires containing precured components. Conventionally, the precured components are buffed to roughen up the surface and a rubber cement is applied to the surface prior to joining the roughened surface of the precured rubber to the uncured rubber surface. The precured rubber and uncured rubber is then vulcanized. Unfortunately, such process steps are time-consuming and inefficient.

SUMMARY OF THE INVENTION

The present invention relates to a process for improving the cured adhesion of a precured rubber compound to an uncured rubber compound. The process involves assembling a pneumatic tire having a precured rubber component which is in contact with an uncured rubber component. The improvement in cured adhesion after the tire is vulcanized is realized by using a precured rubber compound comprising (a) natural rubber, emulsion-polymerized styrene-butadiene rubber and mixtures thereof; (b) precipitated silica; and (c) no fatty acid, other than any fatty acid inherently present in the natural rubber or present from the emulsion polymerization reaction to produce the styrene-butadiene rubber.

DETAILED DESCRIPTION OF THE INVENTION

There is disclosed a process for improving the cured adhesion of at least two rubber components in a pneumatic tire wherein, prior to vulcanization of the tire, one of the two components is a precured rubber compound and the other component is an uncured rubber compound comprising (A) using a precured rubber compound characterized by from 40 to 100 parts by weight of a rubber, per 100 parts by weight of total rubber in said precured rubber compound, selected from the group consisting of natural rubber, emulsion-polymerized styrene-butadiene rubber and mixtures thereof, wherein said rubber contains from 0.5 to 3 phr of a fatty acid inherently present in the natural rubber or present from the polymerization reaction to produce the styrene-butadiene rubber;

(B) from 3 to 80 phr of precipitated silica;

(C) from 0.8 to 3.5 phr of an accelerator;

(D) from 1.0 to 3.5 phr of sulfur, wherein the weight ratio of accelerator to sulfur ranges from 0.5:1 to 3.5:1;

(E) from 1 to 10 phr of zinc oxide; and (F) 0 phr of any fatty acid other than the 0.5 to 3 phr present in said natural rubber and emulsion-polymerized styrene-butadiene rubber.

There is disclosed a process for improving the cured adhesion of a precured rubber component in a pneumatic tire to an uncured rubber component in a tire comprising (A) assembling the tire so a precured rubber component is in contact with an uncured rubber component wherein said precured rubber component comprises (1) from 40 to 100 parts by weight of a rubber, per 100 parts by weight of total rubber in said precured rubber compound, selected from the group consisting of natural rubber, emulsion-polymerized styrene-butadiene rubber and mixtures thereof, wherein said rubber contains from 0.5 to 3 phr of a fatty acid inherently present in the natural rubber or present from the polymerization reaction to produce the styrene-butadiene rubber;

(2) from 3 to 80 phr of precipitated silica;

(3) from 0.8 to 3.5 phr of an accelerator;

(4) from 1.0 to 3.5 phr of sulfur, wherein the weight ratio of accelerator to sulfur ranges from 0.5:1 to 3.5:1;

(5) from 1 to 10 phr of zinc oxide; and (6) 0 phr of any fatty acid other than the 0.5 to 3 phr present in said natural rubber and emulsion-polymerized styrene-butadiene rubber; and (B) vulcanizing the tire at a temperature ranging from 120° C. to 200° C.

The present invention is directed to solving the problem associated with adhering a precured rubber component to an uncured rubber component after vulcanization. This problem exists when 40 to 100 parts by weight of rubber per 100 parts by weight of total rubber in the precured compound is natural rubber or emulsion-polymerized styrene-butadiene rubber. It is well known that natural rubber inherently contains various levels of naturally occurring fatty acids. In addition, it is known to add fatty acids as part of the soap system during the emulsion polymerization of styrene and butadiene to make the styrene-butadiene rubber. Unfortunately, various levels of the fatty acids remain in the recovered rubber. It is believed that use of these rubbers containing anywhere from 0.5 to 3 phr of such fatty acids result in such acids or salts thereof migrating to the surface of the cured rubber and, therefore, resulting in unacceptable adhesion values. Buffing of the surface and the use of rubber cement is then required to obtain acceptable adhesion.

The present invention involves the use of from 40 to 100 parts by weight of natural rubber or emulsion-polymerized styrene-butadiene rubber containing from 0.5 to 3 phr of fatty acids. In those instances where less than 40 parts are used, the complications due to the presence of such fatty acids are minimal. In those instances where the level of fatty acid is less than 0.5 phr, the complications due to the presence of such fatty acids are also minimal. Preferably, the precured rubber component contains from 50 to 100 parts by weight of natural rubber, the above-described styrene-butadiene rubber and mixtures thereof.

In those instances where less than 100 parts by weight is the natural rubber or emulsion-polymerized styrene-butadiene rubber, the remaining 60 phr to 0 phr may be selected from the group consisting of solution polymerized styrene/butadiene copolymers, cis 1,4-polybutadiene, synthetic cis 1,4-polyisoprene, styrene/isoprene copolymers, 3,4-polyisoprene, isoprene/butadiene copolymers, medium vinyl polybutadiene (20 percent to 60 percent by weight of vinyl units), styrene/isoprene/butadiene terpolymers, butyl rubber, polychloroprene, acrylonitrile/butadiene copolymers and ethylene/propylene/diene terpolymers and mixtures thereof. Preferably, if used, from 0 to 50 phr of the additional rubber is used and the preferred rubber is cis 1,4-polybutadiene and solution-polymerized styrene/butadiene copolymers.

The rubbers used in the green or uncured rubber stock may be the same or different than the rubbers used in the precured rubber compound. Preferably, the rubbers used in the green compound, which will be adhered to the precured rubber compound, are natural rubber or a blend containing 50 phr of natural rubber.

The commonly employed precipitated siliceous pigments used in rubber compounding applications can be used as the silica in this invention. The siliceous pigments employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The Rhone-Poulenc Z1165MP silica is currently preferred.

The silica is added to the compound to be used as the precured compound. Optionally, the same silica may be added to the rubber compound for use as the uncured compound. The level of silica that is present in the precured compound may range from about 3 to 80 phr, based on the total rubber in the precured compound. Preferably, the level of silica that is added to the precured rubber compound ranges from 5 to 20 phr.

The silica is intimately dispersed in the rubber compound. The mixing may be accomplished by methods known to those skilled in the rubber mixing art. For example, fixed and variable speed mixers or Banburys™ may be used. The silica is mixed in a nonproductive mix stage. The silica and rubber is mixed for a time and temperature to intimately disperse the silica. For example, mixing at a rubber temperature from 130 to 180° C. for a period of from 10 seconds to 20 minutes.

The rubber compound for use as the precured rubber compound contains at least one accelerator. Accelerators are used to control the time and/or temperature required for vulcanization and to improve the properties of the vulcanizate. The overall amount of accelerator in the precured rubber composition ranges from 0.8 to 3.5 phr. In one embodiment, a single accelerator system may be used, i.e., primary accelerator. The primary accelerator(s) may be used in total amounts ranging from about 0.8 to about 3.5 phr, preferably about 1 to about 2.5 phr. In another embodiment, combinations of a primary and a secondary accelerator might be used with the secondary accelerator being used in smaller amounts (of about 0.2 to about 1.0 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is sulfenamide. If a second accelerator is used, the secondary accelerator is preferably a guanidine, dithiocarbamate or thiuram compound.

As was the case with the rubbers and silica, the same accelerators for use in the precured rubber may be used in the uncured rubber composition. However, the levels of accelerators are generally from about 0.3 to 2.0 phr, with a range of from 0.4 to 1.2 phr being preferred.

The rubber composition for use as the precured rubber compound contains from 1.0 to 3.5 phr of sulfur. Preferably, the precured rubber compound has from 2.5 to 3.2 phr of sulfur. The level of sulfur in the uncured rubber compound may be the same or different amount as in the precured rubber compound. Generally speaking, the level of sulfur in the uncured rubber compound ranges from 1.0 to 6.0 phr, with a range of from 2.0 to 5.0 phr being preferred.

The weight ratio of total accelerator to sulfur present in the precured compound ranges from 0.5:1 to 3.5:1. Preferably, the ratio of accelerator to sulfur ranges from 0.5:1 to 2:1.

The rubber composition for use as the precured rubber compound contains from 1 to 10 phr of zinc oxide. Preferably, the precured rubber compound has from 3 to 5 phr of zinc oxide. The level of zinc oxide in the uncured rubber compound may be the same or different amount as in the precured rubber compound. Generally speaking, the level of zinc oxide in the uncured rubber compound ranges from 1 to 10 phr, with a range of from 2 to 5 phr being preferred.

The overall curatives that are used to make the precured compound and the uncured compound may be the same or different and/or used at different levels. Preferably, each compound has a cure package particularly designed for it based on the rubbers used as well as other ingredients present.

In addition to the rubbers described above for use in the precured rubber compound and uncured rubber compound (as well as the optional rubbers as described above) and silica, a silica coupling agent may be present in one or both of the precured rubber compound and uncured rubber compound. The silica coupling agent is used to promote the interaction of the silica and the rubber. Various known silica couplers may be used.

One example of a silica coupler is a sulfur containing organosilicon compound. Examples of sulfur containing organosilicon compounds are of the formula:

in which Z is selected from the group consisting of

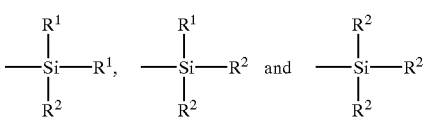

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl)tetrasulfide, 3,3'-bis(triethoxysilylpropyl)octasulfide, 3,3'-bis(trimethoxysilylpropyl)tetrasulfide, 2,2'-bis(triethoxysilylethyl)tetrasulfide, 3,3'-bis(trimethoxysilylpropyl)trisulfide, 3,3'-bis(triethoxysilylpropyl)trisulfide, 3,3'-bis(tributoxysilylpropyl)disulfide, 3,3'-bis(trimethoxysilylpropyl)hexasulfide, 3,3'-bis(trimethoxysilylpropyl)octasulfide, 3,3'-bis(trioctoxysilylpropyl)tetrasulfide, 3,3'-bis(trihexoxysilylpropyl)disulfide, 3,3'-bis(tri-2"-ethylhexoxysilylpropyl)trisulfide, 3,3'-bis(triisooctoxysilylpropyl)tetrasulfide, 3,3'-bis(tri-t-butoxysilylpropyl)disulfide, 2,2'-bis(methoxy diethoxy silyl ethyl)tetrasulfide, 2,2'-bis(tripropoxysilylethyl)pentasulfide, 3,3'-bis(tricyclonexoxysilylpropyl)tetrasulfide, 3,3'-bis(tricyclopentoxysilylpropyl)trisulfide, 2,2'-bis(tri-2"-methylcyclohexoxysilylethyl)tetrasulfide, bis(trimethoxysilylmethyl)tetrasulfide, 3-methoxy ethoxy propoxysilyl 3'-diethoxybutoxy-silylpropyltetrasulfide, 2,2'-bis(dimethyl methoxysilylethyl)disulfide, 2,2'-bis(dimethyl sec.butoxysilylethyl)trisulfide, 3,3'-bis(methyl butylethoxysilylpropyl)tetrasulfide, 3,3'-bis(di t-butylmethoxysilylpropyl)tetrasulfide, 2,2'-bis(phenyl methyl methoxysilylethyl)trisulfide, 3,3'-bis(diphenyl isopropoxysilylpropyl)tetrasulfide, 3,3'-bis(diphenyl cyclohexoxysilylpropyl)disulfide, 3,3'-bis(dimethyl ethylmercaptosilylpropyl)tetrasulfide, 2,2'-bis(methyl dimethoxysilylethyl)trisulfide, 2,2'-bis(methyl ethoxypropoxysilylethyl)tetrasulfide, 3,3'-bis(diethyl methoxysilylpropyl)tetrasulfide, 3,3'-bis(ethyl di-sec. butoxysilylpropyl)disulfide, 3,3'-bis(propyl diethoxysilylpropyl)disulfide, 3,3'-bis(butyl dimethoxysilylpropyl)trisulfide, 3,3'-bis(phenyl dimethoxysilylpropyl)tetrasulfide, 3-phenyl ethoxybutoxysilyl 3'-trimethoxysilylpropyl tetrasulfide, 4,4'-bis(trimethoxysilylbutyl)tetrasulfide, 6,6'-bis(triethoxysilylhexyl)tetrasulfide, 12,12'-bis(triisopropoxysilyl dodecyl)disulfide, 18,1 8'-bis(trimethoxysilyloctadecyl)tetrasulfide, 18,1 8'-bis(tripropoxysilyloctadecenyl)tetrasulfide, 4,4'-bis(trimethoxysilyl-buten-2-yl)tetrasulfide, 4,4'-bis(trimethoxysilylcyclohexylene)tetrasulfide, 5,5'-bis(dimethoxymethylsilylpentyl)trisulfide, 3,3'-bis(trimethoxysilyl-2-methylpropyl)tetrasulfide, 3,3'-bis(dimethoxyphenylsilyl-2-methylpropyl)disulfide.

The preferred sulfur containing organosilicon compounds are the 3,3'-bis(trimethoxy or triethoxy silylpropyl)sulfides. The most preferred compound is 3,3'-bis(triethoxysilylpropyl)tetrasulfide. Therefore, as to the above formula, preferably Z is

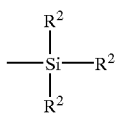

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 2 to 5 with 4 being particularly preferred.

The amount of the sulfur containing organosilicon compound in a rubber composition will vary depending on the level of silica that is used. Generally speaking, the amount of the organosilicon compound will range from 0.5 to 50 phr. Preferably, the amount will range from 1.5 to 8 phr. Depending on the desired properties, the weight ratio of the sulfur containing organosilicon compound to silica may vary. Generally speaking, the weight ratio will range from 1:100 to 1:5. Preferably, the weight ratio will range from 1:20 to 1:10.

The precured rubber compound as well as the uncured rubber compound may contain a reinforcing carbon black. Typical amounts of reinforcing-type carbon black(s), range from 30 to 90 phr. Preferably, the carbon black level ranges from 35 to 70 phr. Representative of the carbon blacks which may be used include those known to those skilled in the art under the ASTM designations N110, N121, N220, N231, N234, N242, N293, N299, S315, N326, N330, N332, N339, N343, N347, N351, N358, N375 and mixtures thereof.

Both the precured compound and the uncured compound may contain various commonly used additive materials such as, for example, processing additives such as oils, resins including tackifying resins and plasticizers, pigments, waxes, antioxidants and antiozonants and peptizing agents. Depending on the intended application for the assembled pressured rubber compound/uncured compound article, the additives mentioned above are selected and commonly used in conventional amounts. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The silica rubbers, organosilane, if used, carbon black and zinc oxide, including sulfur vulcanizing, are mixed in a nonproductive stage of mixing. Mixing of a nonproductive compound with curatives is conventionally called "productive" mix stage. Productive mixing typically occurs at a temperature, or ultimate temperature lower than the mix temperature(s) of the preceding nonproductive stage(s) and always below the subsequent cure temperatures. Typical mixing of the productive compound is at a rubber temperature ranging from 80 to 110° C. for a period of 50 seconds to 3 minutes.

Vulcanization of the rubber composition intended to be the precured compound is generally carried out at conventional temperatures ranging from 120° C. to 200° C. Preferably, the vulcanization is conducted at temperatures ranging from 140° C. to 180° C. Any of the usual vulcanization processes may be used such as heating in a press or mold, injection molding, heating with superheated steam or hot air or in a salt bath.

Upon vulcanization, the precured rubber composition, may be used for various purposes. For example, the precured rubber may be in the form of a tread, apex or innerliner for use in a pneumatic tire. In case of a tire, it can be used as a tire component and assembled in a tire by standard means. Such tires can be built, shaped, molded and cured by various methods which are known and will be readily apparent to those having skill in such art. Preferably, the precured rubber composition is a tread or apex of a tire. As can be appreciated, the tire may be a passenger tire, aircraft tire, truck tire and the like. Preferably, the tire is a truck tire. The tire may also be a radial or bias, with a radial tire being preferred.

After the precured component is assembled in a tire and in contact with an uncured rubber component, the tire is vulcanized at a temperature ranging from 120° C. to 200° C. Upon vulcanization, excelled adhesion is achieved between the precured compound and the now vulcanized uncured compound.

The invention may be better understood by reference to the following examples in which the parts and percentages are by weight unless otherwise indicated.

The following examples are presented in order to illustrate but not limit the present invention.

The following tables report cure properties that were determined from the rubber stocks that were prepared. These properties include tensile modulus, tensile strength, hardness, rebound values and autovibron properties.

Cure properties were determined using a Monsanto oscillating disc rheometer which was operated at a temperature of 150° C. and at a frequency of 11 hertz. A description of oscillating disc rheometers can be found in the *Vanderbilt Rubber Handbook* edited by Robert O. Babbit (Norwalk, Conn., R. T. Vanderbilt Company, Inc, 1978), Pages 583 through 591. The use of this cure meter and standardized values read from the curve are specified in ASTM D-2084. A typical cure curve obtained on an oscillating disc rheometer is shown on Page 588 of the 1978 edition of the *Vanderbilt Rubber Handbook*.

In such an oscillating disc rheometer, compounded rubber samples are subjected to an oscillating shearing action of constant amplitude. The torque of the oscillating disc embedded in the stalk that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained from the various rubber formulations that were prepared. These properties include a torque minimum (Minimum torque), a torque maximum (Maximum torque), the total increase in torque (Delta torque), minutes to 25 percent of the torque increase (T25), minutes to 50 percent of the torque increases (T50) and minutes to 90 percent of the toque increase (T90).

Strebler adhesion testing was done to determine the interfacial adhesion between various rubber formulations that were prepared after being precured (Rubber A) for 10 minutes at 170° C. and then curing together (Rubbers A and B) for 18 minutes at 150° C. The interfacial adhesion between Rubbers A and B was determined by pulling the precured compound (Rubber A) away from the other rubber compound (Rubber B) at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing. The uncured compound (Rubber B) comprised 100 parts of natural rubber, 17 phr of silica and 20 phr of carbon black conventional amounts of processing oil antidegradants, accelerators, peptizer, 4 phr sulfur and 1 phr stearic acid.

EXAMPLES 1 THROUGH 14

Rubber compounds were prepared by mixing the various ingredients which comprised the materials in Tables 1 and 2. The rubber compounds were mixed in a Banbury™ in two stages. The first stage (nonproductive) was mixed at a temperature of up to 160° C. after which the compounds were sheeted out and cooled. The sheeted stocks were then mixed along with the curatives (productive) at a temperature of up to 110° C., sheeted out and cooled.

Samples 1 through 8 are controls due to the addition of fatty acid or the absence of silica. Samples 9 through 14 are representative of the present invention.

TABLE 1

| Sample No. | Control 1 | Control 2 | Control 3 | Control 4 | Control 5 | Control 6 | Control 7 | Control 8 |
|---|---|---|---|---|---|---|---|---|
| Nonproductive | | | | | | | | |
| Natural rubber | 50 | 50 | 50 | 50 | 50 | 50 | 50 | 50 |
| Polybutadiene | 25 | 25 | 25 | 25 | 25 | 25 | 25 | 25 |
| Medium polybutadiene | 34.38 | 34.38 | 34.38 | 34.38 | 34.38 | 34.38 | 34.38 | 34.38 |
| Carbon black | 60 | 60 | 60 | 60 | 60 | 60 | 60 | 60 |
| Silica[1] | 0 | 0 | 5 | 10 | 15 | 5 | 10 | 15 |
| Fatty acids[2] | 0 | 2.5 | 2.5 | 2.5 | 2.5 | 2.5 | 2.5 | 2.5 |
| Resins[3] | 1.5 | 1.5 | 1. | 1.5 | 1.5 | 1.5 | 1.5 | 1.5 |
| Antioxidant | 1 | 1 | 1 | 1 | 1 | 1 | 1 | 1 |
| Peptizer | .25 | .25 | .25 | .25 | .25 | .25 | .25 | .25 |
| Waxes | 1.5 | 1.5 | 1.5 | 1.5 | 1.5 | 1.5 | 1.5 | 1.5 |
| Antioxidant | 2.5 | 2.5 | 2.5 | 2.5 | 2.5 | 2.5 | 2.5 | 2.5 |
| Zinc oxide | 2 | 2 | 2 | 2 | 2 | 2 | 2 | 2 |
| Silica coupler[4] | 0 | 0 | .8 | 1.6 | 2.4 | 0 | 0 | 0 |
| Total | 180.63 | 183.13 | 188.93 | 194.73 | 200.53 | 188.13 | 193.13 | 198.13 |
| Productive | | | | | | | | |
| Nonproductive | 180.63 | 183.13 | 188.93 | 194.73 | 200.53 | 188.13 | 193.13 | 198.13 |
| Hexamethoxy-methylmelamine | .75 | .75 | .75 | .75 | .75 | .75 | .75 | .75 |
| N-cyclohexyl benzothiazole-2-sulfenamide | .85 | .85 | .85 | .85 | .85 | .85 | .85 | .85 |

TABLE 1-continued

| Sample No. | Control 1 | Control 2 | Control 3 | Control 4 | Control 5 | Control 6 | Control 7 | Control 8 |
|---|---|---|---|---|---|---|---|---|
| Zinc oxide | 1 | 1 | 1 | 1 | 1 | 1 | 1 | 1 |
| Quaternary salt[5] | .2 | .2 | .2 | .2 | .2 | .2 | .2 | .2 |
| Diphenyl guanidine | .4 | .4 | .4 | .4 | .4 | .4 | .4 | .4 |
| Hexamethylenetetramine | .75 | .75 | .75 | .75 | .75 | .75 | .75 | .75 |
| N-cyclohexylthiophthalimide | .1 | .1 | .1 | .1 | .1 | .1 | .1 | .1 |
| Sulfur | 1.2 | 1.2 | 1.2 | 1.2 | 1.2 | 1.2 | 1.2 | 1.2 |
| Rheometer 150° C., 1° arc, 100 cpm[3] | | | | | | | | |
| T1 (min) | 3.4 | 3.5 | 3.3 | 3.2 | 3.3 | 3.5 | 3.6 | 3.6 |
| T25 (min) | 4.3 | 4.1 | 4.1 | 4.2 | 4.5 | 4.2 | 4.4 | 4.5 |
| T50 (min) | 4.8 | 4.7 | 4.8 | 5.1 | 5.5 | 4.9 | 5.2 | 5.4 |
| T90 (min) | 6.5 | 7.2 | 7.6 | 8.7 | 9.8 | 7.5 | 7.9 | 8.5 |
| Minimum torque (dNm) | 5.3 | 4.13 | 4.81 | 5.81 | 5.83 | 5.32 | 5.75 | 5.9 |
| Maximum torque (dNm) | 21.4 | 18.66 | 19.56 | 20.92 | 20.89 | 19.72 | 19.77 | 19.48 |
| Delta torque (dNm) | 16.1 | 14.53 | 14.75 | 15.11 | 15.06 | 14.4 | 14.02 | 13.58 |
| Strebler adhesion (N) | 46 | 41.24 | 9.89 | 8.55 | 8.8 | 9.06 | 10.97 | 29.3 |

TABLE 2

| Sample No. | 9 | 10 | 11 | 12 | 13 | 14 |
|---|---|---|---|---|---|---|
| Nonproductive | | | | | | |
| Natural rubber | 50 | 50 | 50 | 50 | 50 | 50 |
| Polybutadiene | 25 | 25 | 25 | 25 | 25 | 25 |
| Medium polybutadiene | 34.38 | 34.38 | 34.38 | 34.38 | 34.38 | 34.38 |
| Carbon black | 60 | 60 | 60 | 60 | 60 | 60 |
| Silica[1] | 5 | 10 | 15 | 5 | 10 | 15 |
| Fatty acids[2] | 0 | 0 | 0 | 0 | 0 | 0 |
| Resins[3] | 1.5 | 1.5 | 1.5 | 1.5 | 1.5 | 1.5 |
| Antioxidant | 1 | 1 | 1 | 1 | 1 | 1 |
| Peptizer | .25 | .25 | .25 | .25 | .25 | .25 |
| Waxes | 1.5 | 1.5 | 1.5 | 1.5 | 1.5 | 1.5 |
| Antioxidant | 2.5 | 2.5 | 2.5 | 2.5 | 2.5 | 2.5 |
| Zinc oxide | 2 | 2 | 2 | 2 | 2 | 2 |
| Silica coupler[4] | .8 | 1.6 | 2.4 | 0 | 0 | 0 |
| Total | 186.43 | 192.23 | 198.03 | 185.63 | 190.63 | 195.63 |
| Productive | | | | | | |
| Nonproductive | 186.43 | 192.23 | 198.03 | 185.63 | 190.63 | 195.63 |
| Hexamethoxymethylmelamine | .75 | .75 | .75 | .75 | .75 | .75 |
| N-cyclohexyl benzothiazole-2-sulfenamide | .85 | .85 | .85 | .85 | .85 | .85 |
| Zinc oxide | 1 | 1 | 1 | 1 | 1 | 1 |
| Quaternary salt[5] | .2 | .2 | .2 | .2 | .2 | .2 |
| Diphenyl guanidine | .4 | .4 | .4 | .4 | .4 | .4 |
| Hexamethylenetetramine | .75 | .75 | .75 | .75 | .75 | .75 |
| N-cyclohexyl-thiophthalimide | .1 | .1 | .1 | .1 | .1 | .1 |
| Sulfur | 1.2 | 1.2 | 1.2 | 1.2 | 1.2 | 1.2 |
| Rheometer, 150° C., 1° arc, 100 cpm[3] | | | | | | |
| T1 (min) | 3.3 | 2.7 | 2 | 3.2 | 2.9 | 2.3 |
| T25 (min) | 4.4 | 4 | 4.1 | 4 | 4.2 | 4.3 |
| T50 (min) | 4.9 | 4.7 | 5 | 4.6 | 4.9 | 5.3 |
| T90 (min) | 6.7 | 6.6 | 8.8 | 6.3 | 6.7 | 7.9 |
| Minimum torque (dNm) | 5.8 | 6.4 | 7.4 | 6.8 | 6.3 | 7.6 |
| Maximum torque (dNm) | 20.9 | 20.4 | 22.3 | 21.7 | 21.7 | 21.9 |
| Delta torque (dNm) | 15.1 | 14 | 14.9 | 14.9 | 15.4 | 14.3 |
| Strebler adhesion (N) | 117.5 | 127.3 | 142 | 119.5 | 129.1 | 142.7 |

[1]Precipitated, hydrated amorphous silica obtained from Rhone Poulenc under the designation Z1165MP.
[2]Stearic acid
[3]Phenol formaldehyde thermosetting resin obtained from Occidental Chemical Co. under the designation Durez ™ resin 12687
[4]A 50/50 by weight mixture of carbon black/3,3'-bis(triethoxysilylpropyl) tetrasulfide obtained from Degussa AG under the designation 5:69.
[5]Trialkyl ($C_8$–$C_{10}$) methylammonium chloride obtained from Witco Chemical Company under the designation Adogen ™ RA-20.

Control 1 represents a precured rubber sample with no fatty acid added and no silica. Control 2 represents added fatty acid and no silica. Controls 3 through 8 represent added fatty acid and varying levels of silica. Samples 9 through 14 represent the present invention. Each of these samples, no fatty acid is added and varying levels of silica is added. As can be seen from the Strebler Adhesion values, the absence of fatty acids being added coupled with the addition of silica results in significant improvements in cured rubber adhesion as measured by Strebler Adhesion.

What is claimed is:

1. A process for improving the cured adhesion of a precured rubber component in a pneumatic tire to an uncured rubber component in a tire comprising
   (A) assembling the tire so a precured rubber component is in contact with an uncured rubber component wherein said precured rubber component comprises
      (1) from 40 to 100 parts by weight of a rubber, per 100 parts by weight of total rubber in said precured rubber compound, selected from the group consisting of natural rubber, emulsion-polymerized styrene-butadiene rubber and mixtures thereof, wherein said rubber contains from 0.5 to 3 phr of a fatty acid inherently present in the natural rubber or present from the polymerization reaction to produce the styrene-butadiene rubber;
      (2) from 3 to 80 phr of precipitated silica;
      (3) from 0.8 to 3.5 phr of an accelerator;
      (4) from 1.0 to 3.5 phr of sulfur, wherein the weight ratio of accelerator to sulfur ranges from 0.5:1 to 3.5:1;

(5) from 1 to 10 phr of zinc oxide; and (6) 0 phr of any fatty acid other than the 0.5 to 3 phr present in said natural rubber and emulsion-polymerized styrene-butadiene rubber; and (B) vulcanizing the tire at a temperature ranging from 120° C. to 200° C.

2. The process of claim 1 wherein from 50 to 100 parts by weight of said rubber is selected from the group consisting of natural rubber, emulsion-polymerized styrene-butadiene rubber and mixtures thereof.

3. The process of claim 1 wherein said components are selected from the group consisting of a tread, apex and innerliner.

4. The process of claim 3 wherein said precured rubber component is selected from the group consisting of a tread, apex and innerliner.

5. The process of claim 1 wherein from 5 to 20 phr of silica is present.

6. The process of claim 1 wherein said accelerator is selected from the group consisting of amines, disulfides, guanidines, thioureas, thiazoles, thiurams, sulfenamides, dithiocarbamates, xanthates and mixtures thereof.

7. The process of claim 1 wherein said rubber in said precured rubber composition is natural rubber.

8. The process of claim 1 wherein said rubber in said precured rubber composition is emulsion-polymerized styrene-butadiene rubber.

9. The process of claim 1 wherein from 0 to 60 parts by weight of said rubber in said precured rubber compound is selected from the group consisting of solution polymerized stryene/butadiene copolymers, cis 1,4-polybutadiene, synthetic cis 1,4-polyisoprene, styrene/isoprene copolymers, 3,4-polyisoprene, isoprene/butadiene copolymers, medium vinyl polybutadiene, styrene/isoprene/butadiene terpolymers, butyl rubber, polychloroprene, acrylonitrile/butadiene copolymers and ethylene/propylene/diene terpolymers and mixtures thereof.

10. The process of claim 1 wherein the weight ratio of accelerator to sulfur ranges from about 0.5:1 to 2:1.

11. The process of claim 1 wherein said rubber is natural rubber and the concentration range of said precipitated silica is from 5 to 15 phr.

* * * * *